US011754761B2

(12) United States Patent
Eytan et al.

(10) Patent No.: US 11,754,761 B2
(45) Date of Patent: Sep. 12, 2023

(54) HIGH-RESOLUTION AUTOMOTIVE LENS AND SENSOR (71) Applicant: Mobileye Vision Technologies Ltd., Jerusalem (IL)

(72) Inventors: Ori Eytan, Jerusalem (IL); Efim Belman, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 45 days.

(21) Appl. No.: 17/575,052

(22) Filed: Jan. 13, 2022

(65) Prior Publication Data

US 2022/0150452 A1 May 12, 2022

Related U.S. Application Data (63) Continuation of application No. 16/434,520, filed on Jun. 7, 2019, now Pat. No. 11,231,532.
(Continued)

(51) Int. Cl.
  *G02B 5/20* (2006.01)
  *G02B 3/04* (2006.01)
  (Continued)

(52) U.S. Cl.
  CPC ............... *G02B 5/201* (2013.01); *G02B 3/04* (2013.01); *G02B 5/208* (2013.01); *H04N 23/55* (2023.01);
  (Continued)

(58) Field of Classification Search
  CPC .......... G02B 5/201; G02B 3/04; G02B 5/208; G02B 13/001; H04N 23/55; H04N 23/57;
  (Continued)

(56) References Cited

U.S. PATENT DOCUMENTS 8,610,813 B2  12/2013 Gao et al.
9,049,390 B2 *  6/2015 Venkataraman ..... H04N 13/257
  (Continued)

FOREIGN PATENT DOCUMENTS

CN  112514375 A  3/2021
EP  1527735 A1  5/2005
  (Continued)

OTHER PUBLICATIONS

"Korean Application Serial No. 10-2020-7036665, Response filed Mar. 17, 2022 to Notice of Preliminary Rejection dated Jan. 20, 2022", w English claims, 17 pgs.
  (Continued)

*Primary Examiner* — Seung C Sohn
(74) *Attorney, Agent, or Firm* — Schwegman Lundberg & Woessner, P.A.

(57) ABSTRACT

A camera for use in automotive applications includes a lens system having a modulation transfer function (MTF) tuned to process light in a spectral range from red to green with greater resolution than light in a spectral range from blue to violet. The camera also includes an imager having pixel sensors arranged in a matrix and a color filter matrix including multiple color filter elements, each corresponding to a pixel sensor of the imager. The color filter matrix includes red filter elements and yellow filter elements and the number of yellow filter elements is greater than the number of red filter elements.

20 Claims, 7 Drawing Sheets

Related U.S. Application Data (60) Provisional application No. 62/682,082, filed on Jun. 7, 2018.

(51) Int. Cl.
  *H04N 23/55*    (2023.01)
  *H04N 23/57*    (2023.01)
  *H04N 25/131*   (2023.01)
  *H04N 25/13*    (2023.01)

(52) U.S. Cl.
  CPC ........... *H04N 23/57* (2023.01); *H04N 25/131* (2023.01); *H04N 25/135* (2023.01)

(58) Field of Classification Search
  CPC .. H04N 25/131; H04N 25/135; H04N 25/134; H04N 25/136
  See application file for complete search history.

(56) References Cited

U.S. PATENT DOCUMENTS

| | | | |
|---|---|---|---|
| 9,179,110 B2 | 11/2015 | Mackey et al. | |
| 9,549,673 B2 | 1/2017 | Akita et al. | |
| 10,110,794 B2 * | 10/2018 | Laroia | H04N 23/667 |
| 10,520,696 B2 | 12/2019 | Kanzaki | |
| 10,816,765 B2 | 10/2020 | Chang et al. | |
| 11,231,532 B2 | 1/2022 | Eytan et al. | |
| 2012/0069551 A1 | 3/2012 | Bues et al. | |
| 2012/0321293 A1 | 12/2012 | Schauss et al. | |
| 2013/0003184 A1 | 1/2013 | Duparre | |
| 2014/0125838 A1 | 5/2014 | Mackey et al. | |
| 2014/0139936 A1 | 5/2014 | Lee | |
| 2018/0260639 A1 | 9/2018 | Kapach et al. | |
| 2018/0268226 A1 | 9/2018 | Shashua et al. | |
| 2019/0377110 A1 | 12/2019 | Eytan et al. | |

FOREIGN PATENT DOCUMENTS

| | | |
|---|---|---|
| JP | H08237436 | 9/1996 |
| JP | 2007295113 | 11/2007 |
| JP | 2009080084 | 4/2009 |
| JP | 2013048245 | 3/2013 |
| JP | 2015167399 | 9/2015 |
| JP | 2016084381 | 5/2016 |
| JP | 2017123502 | 7/2017 |
| JP | 7111842 | 7/2022 |
| KR | 20140066684 | 6/2014 |
| KR | 102386672 | 4/2022 |
| WO | WO-2019234504 A2 | 12/2019 |

OTHER PUBLICATIONS

"Chinese Application Serial No. 201980038183.7, Office Action dated Apr. 27, 2022", w English translation, 23 pgs.

"Chinese Application Serial No. 201980038183.7, Response filed Sep. 13, 2022 to Office Action dated Apr. 27, 2022", w English Claims, 51 pgs.

"European Application Serial No. 19772822.3, Response to Communication Pursuant to Rules 161 and 162 EPC filed Jul. 29, 2021", 17 pgs.

"Korean Application Serial No. 10-2020-7036665, Notice of Preliminary Rejection dated Jan. 20, 2022", w English Translation, 7 pgs.

"U.S. Appl. No. 16/434,520, Non Final Office Action dated Mar. 31, 2021", 9 pgs.

"U.S. Appl. No. 16/434,520, Notice of Allowance dated Sep. 20, 2021", 9 pgs.

"U.S. Appl. No. 16/434,520, Response filed Aug. 2, 2021 to Non Final Office Action dated Mar. 31, 2021", 13 pgs.

"Bayer filter—Wikipedia", <https://en.wikipedia.org/w/index.php?title=Bayer_filter&oldid=713965003>, (Apr. 6, 2016), 1 pg.

"International Application Serial No. PCT/IB2019/000735, International Preliminary Report on Patentability dated Dec. 17, 2020", 12 pgs.

"International Application Serial No. PCT/IB2019/000735, International Search Report dated Dec. 17, 2019", 7 pgs.

"International Application Serial No. PCT/IB2019/000735, Invitation to Pay Additional Fees dated Oct. 23, 2019", 12 pgs.

"International Application Serial No. PCT/IB2019/000735, Written Opinion dated Dec. 17, 2019", 10 pgs.

"Korean Application Serial No. 10-2020-7036665, Voluntary Amendment filed Dec. 29, 2021", w/ English claims, 12 pgs.

Jeffrey, Hoffman, et al., "Efficiently Manage Optical System Requirements with Specification-Guided Software", <https://www.synopsys.eom/content/dam/synopsys/optical-soluti ons/documents/whitepapers/specification_guided_software.pdf>, (May 15, 2018), 1-7.

* cited by examiner

HIGH-RESOLUTION AUTOMOTIVE LENS AND SENSOR

CROSS REFERENCE TO RELATED APPLICATIONS

This patent application is a continuation of U.S. Provisional application Ser. No. 16/434,520, filed on Jun. 7, 2019, which claims the benefit of priority, under 35 U.S.C. § 119(e), to: U.S. Provisional Application Ser. No. 62/682,081, titled "COST EFFECTIVE LENS AND SENSOR DESIGN FOR HIGH RESOLUTION AUTOMOTIVE APPLICATIONS" and filed on Jun. 7, 2018 the entire contents of which are hereby incorporated by reference herein.

TECHNICAL FIELD

Embodiments described herein generally relate to image capture systems and more specifically to a lens, color filter, and imager assembly having automotive applications.

BACKGROUND

Autonomous or semi-autonomous automotive technologies, often referred to as "self-driving" or "assisted-driving" operation in automobiles, are undergoing rapid development and deployment in commercial- and consumer-grade vehicles. These systems use an array of sensors to continuously observe the vehicle's motion and surroundings. These sensors may be used to observe the vehicle's surroundings, such as the road surface and boundaries, lane markings, other vehicles, pedestrians, objects and hazards, signage, and other relevant items.

Image-capture sensors that include one or more cameras are particularly useful for detecting and recognizing objects, monitoring other vehicles, and for reading signs and road markings. Camera-based systems have been applied to measure three-dimensional structures, such as the vertical contour of the road, to identify lane markers, and curbs, and to detect objects or hazards. Practical sensor systems are expected to provide high-resolution images reliably in varying weather and road conditions across a wide field of view.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document

DESCRIPTION OF EMBODIMENTS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Embodiments described below implement a camera lens and color filter matrix that are tuned to light in the red to green spectral range without consideration for light in the blue spectral range. The red to green spectral range is used in automotive applications to perform many sensing functions including, without limitation, to sense red, yellow, and green traffic signals, to sense activation of brake lights of other vehicles, to identify and read road signs and lane markings, and to identify obstacles. None of these tasks relies on light in the blue spectral range. Furthermore, a lens system that ignores the blue spectral range may produce a more focused image in the red, yellow, and green spectral ranges, improving the resolution of the images captured by the camera.

An active pixel sensor (APS) imager, such as a complementary metal-oxide semiconductor (CMOS) imager, is sensitive to a wide range of wavelengths that includes the visible spectrum from 400 nm to 700 nm. Images captured by an APS imager represent all wavelengths in the visible spectrum as well as wavelengths in the infrared (IR) and ultra-violet (UV) spectrum. To capture a color image, an APS imager may employ one or more cut filters to attenuate wavelengths in the IR and UV spectrum and a color filter matrix arranged in front of the individual pixel sensors of the imager in a particular pattern. The pattern includes multiple color pixel filter elements to pass light in different portions of the visible spectrum to different pixel sensors of the APS imager. Although the embodiments described herein use APS imagers, other embodiments may use other types of imagers, for example, charge-coupled device (CCD) imagers, The color filter elements may include red (R), green (G), and blue (B) pixel filter elements arranged in a pattern that repeats vertically and horizontally across all pixel sensor positions of the APS imager. The signals captured by the pixel sensors are combined to generate an image having good resolution and proper color rendition even in low-light environments. The Bayer filter for example uses twice as many green pixel filters as red and blue filters arranged in an RGGB two-by-two matrix pattern such that one row of the pattern includes alternating R and G filters and the next row of the pattern includes alternating G and B filters. An alternative filter pattern uses complimentary color filter elements such as cyan (Cy), yellow (Y), and magenta (M). The R, G, and B pixel filters each reduce the amount of light reaching the respective pixel sensors by about $2/3$ while the Cy, Y, and M pixel filters reduce the amount of light reaching the pixel sensors by about ⅓.

Monochrome sensors, which have no color filters and thus allow all incident light to reach the pixel sensors, have significantly better low light performance than imagers having a color filter matrix. One filter matrix that achieves good low light performance and still retains some color information uses only red and clear color filter elements. For example, a RCCC (red, clear, clear, clear) filter matrix has been developed for automotive applications. This filter has no G or B filter elements and has R filter elements covering only every second pixel sensor in every second row. The R filter elements allow a camera system using this filter to detect red traffic signals and break lights of other vehicles. The lack of G filters, however, makes it difficult for optical systems including an RCCC filter matrix to sense other colors, such as yellow traffic signs and/or yellow and green traffic signals.

In addition to the imager, an automotive camera includes a lens system that focuses light from a scene onto the imager. It is desirable for such lens system to provide high-resolution images over a wide field of view. The resolution of an image projected by a lens system is a function of the spatial frequency response of the lens system. The spatial frequency response of an optical system may be specified in terms of the modulation transfer function (MTF) of the system. The MTF is the modulus of the optical transfer function (OTF), which specifies how an optical system affects the amplitude and phase of light from a scene projected onto a detector array. The OTF is the Fourier transform of the point spread function (PSF). The PSF is the impulse response of the optical system (e.g., the image produced from an ideal point source). Because the OTF is Fourier transform it is a complex function having values in both the real and imaginary planes. The MTF is the modulus (e.g., absolute value) of the complex OTF. The MTF ignores the phase portion of the transfer function providing a measure of how the amplitude of the projected light changes across the relevant spectrum. Both the OTF and the MTF specify the response of the optical system to a periodic sine-wave pattern passing through the optical system. This response is a function of both the spatial frequency or period and orientation of the sine wave pattern.

The OTF and MTF measurements described herein may specify a particular resolution. The resolution may be specified as cycles per millimeter (CYC/mm) or line-pairs per millimeter (lp/mm). A lens system capable of resolving 10 μm features has a resolution of 100 lp/mm. Thus, a lens system having an MTF of 80% at 100 lp/mm may project an image having 200 lines per millimeter that is slightly blurred compared to the original image.

Figure 1:
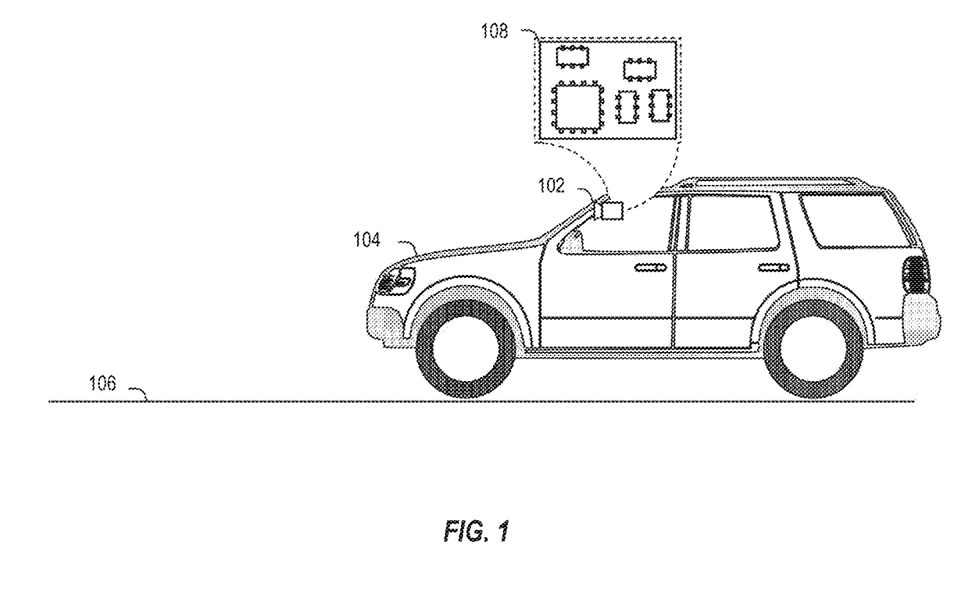
FIG. 1 is a side-view drawing of a vehicle including an automotive camera according to an example embodiment.

FIG. 1 is a block diagram of an example vehicle 104 having a camera 102 that includes processing circuitry 108. The camera 102 is affixed to the vehicle 104 and monitors the environment of the vehicle 104. In an example, the processing circuitry 108 is integrated into the camera 102. FIG. 1 shows, the camera by way of example as a forward looking camera mounted behind the windshield. The camera components described herein, however, may be used for rear or side facing cameras mounted inside or outside of the vehicle 104.

In an example system, the processing circuitry 108 performs vehicle environment modeling via images obtained from the camera 102. In the example shown in FIG. 1, the vehicle environment modeling may include modeling the road surface 106, obstacles, obstructions, and moving bodies (e.g., other vehicles, pedestrians, animals, etc.). It is contemplated, however, that the camera 102 or other cameras (not shown) may be used to model traffic signals, road signs, and environmental conditions. These models may be used by the processing circuitry 108 directly, or via another management system (not shown), to adjust operating parameters of the vehicle 104 based on the sensed environmental conditions. For example, the processing circuitry may use the camera 102 to monitor lane markers on the road surface 106 and to alert the driver upon detecting that the vehicle 104 is crossing a lane marker. To perform the modeling of the road surface 106, for example, the processing system 108 is arranged to obtain a time-ordered sequence of images representative of the road surface 106.

Figure 2:
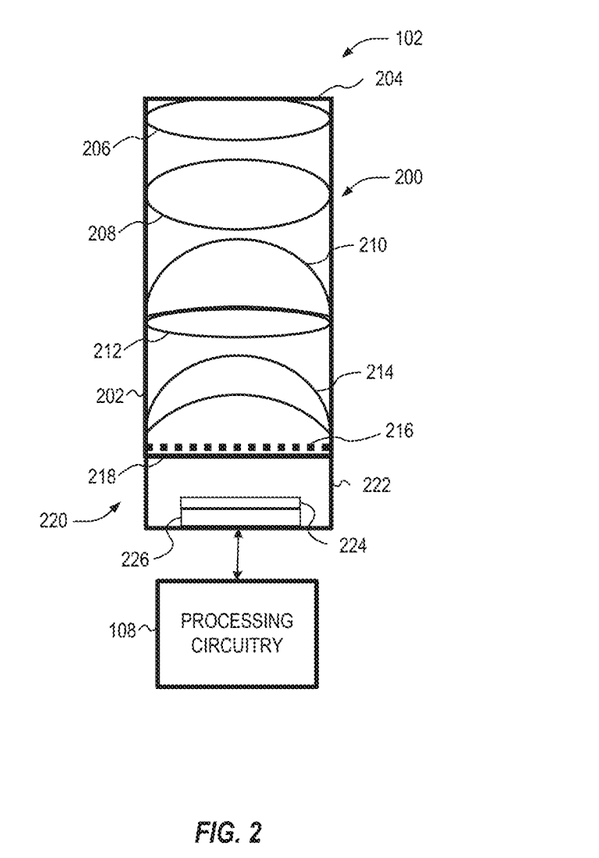
FIG. 2 is a cut-away side view drawing showing components of an automotive camera according to an example embodiment.

FIG. 2 is a schematic diagram of components of an example camera that may be used as the camera 102 shown in FIG. 1. The example camera 102 includes a lens system 200 coupled to an imager system 220. The lens system 200 is contained in a lens barrel 202 having a front cover glass 204 and a rear cover glass 218. The example lens system 200 includes a first biconvex lens 206, a second biconvex lens 208, a composed lens including a positive meniscus lens 210 and a biconvex lens 212, and a second positive meniscus lens 214. The lens system 200 also includes a cut filter 216 that attenuates light in the IR and UV spectral ranges that is projected from the lens system 200 onto the imager system 220. Because the lens system 200 is configured to provide a relatively large MTF for light in the red to green spectral range, the cut filter 216 may be configured to attenuate at least a portion of the light in the blue spectral range in addition to attenuating light in the IR and UV spectral ranges Any of the lens elements 206, 208, 210, 212, and/or 214 may be a spherical or non-spherical element. The lenses 210 and 212 that form the composed lens may be joined by an optical cement or separated by air. This lens configuration is one possible configuration. Other configurations that satisfy the design rules described below with reference to Tables 1, 2, and 3 may be used in place of the lens system 200.

The imager system 220 includes a housing 222, a color filter matrix 224, and an APS image sensor 226, which may be a CMOS sensor. The relative sizes of the color filter matrix 224 and imager 226 are exaggerated to aid description of the imager system 220. The imager 226 is positioned at a location relative to the lens system 200 in the housing 222 such that images from a scene are focused onto the top surface of the imager 226 through the color filter matrix 224. Pixel data captured by the imager 226 is provided to the processing circuitry 108, which may also control the operation of the imager 226.

Figure 3A:
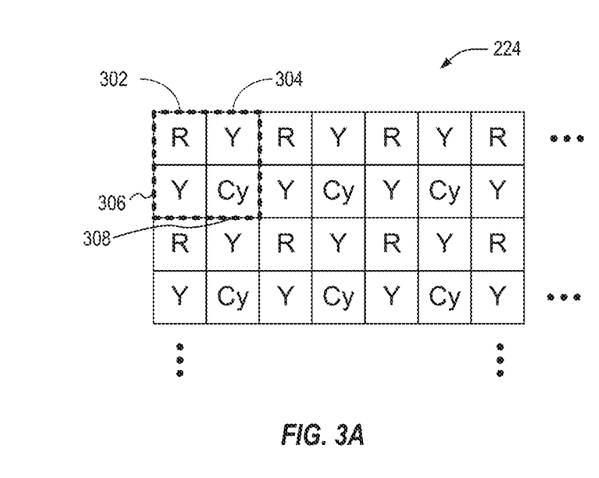
FIG. 3A is a top-plan view of a color filter matrix according to an example embodiment.

The color filter matrix 224 of the imager system 220 is a RYYCy filter matrix according to an example embodiment. An example layout of the color filter matrix 224 is shown in FIG. 3A. Conventional color filter such as an RGGB filter matrix or a CyYYM filter matrix produce images that span the spectrum from red to blue. These filters, however, reduce the amount of light reaching the pixel sensors by ⅓ or ⅔, as described above. This reduction in the amount of light results in a reduced quantum efficiency (QE) for the imager. The QE of an imager is a ratio of electrons produced by the imager from photons impinging on the imager thus, QE is a measure of the efficiency of an imager in converting photons into electrons. The RYYCy filter matrix is one example matrix. Other filter matrixes which may be used include RYYB, RYYY, RYYG, and RYYC. Other example filter matrixes may be used if the cut filter 216 is tuned to attenuate light in the blue spectral range as well as light in the IR and UV spectral ranges. In this instance, an RCCC or RCCB filter matrix may produce acceptable images when used with a lens system such as the lens system 200, described above, which the MTF of the lens system 200 is configured for the red to green range of the spectrum.

As described herein, for automotive applications, image data from the blue spectral range may be less important than image data from the red to green spectral range. One way to increase the quantum efficiency of an imager without increasing the aperture of the lens is to design a lens that is configured to produce a sharper image in the red to green spectral range than in the blue spectral range and provide a color filter matched to the lens.

When mixing light, yellow light is a combination of red light and green light. In an example embodiment, the imager color filter matrix 224 is designed to match the lens system 200 and both the lens system 200 and color filter matrix 224 are configured to emphasize light in the red to green spectral range over light in the blue to violet spectral range. As described above, the RCCC filter matrix is currently used in many automotive applications. The color filter matrix 224 according to example embodiments uses yellow filter elements instead of clear filter elements such that imager pixel positions under the yellow filter elements provide most of the information from the imager. The processing circuitry 108 uses red filter elements to detect taillights as in the RCCC filter matrix. Because the difference between yellow filter elements and red filter elements is not as strong as the difference between clear filter elements and red filter elements, the example color filter matrixes 224 also use cyan filter elements. The cyan filter elements also help the processing system 108 to distinguish between red and orange. The example color filter matrix 224 is a RYYCy filter matrix, an example of which is shown in FIG. 3A. As shown, the filter includes a pattern of R, Y, and Cy filter elements that repeats horizontally and vertically. The pattern includes four filters elements arranged in a two-by-two submatrix, an R filter 302, a first Y filter 304, a second Y filter 306, and a Cy filter 308. The two-by-two submatrix repeats both horizontally and vertically across the surface of the imager 226.

Figure 3B:
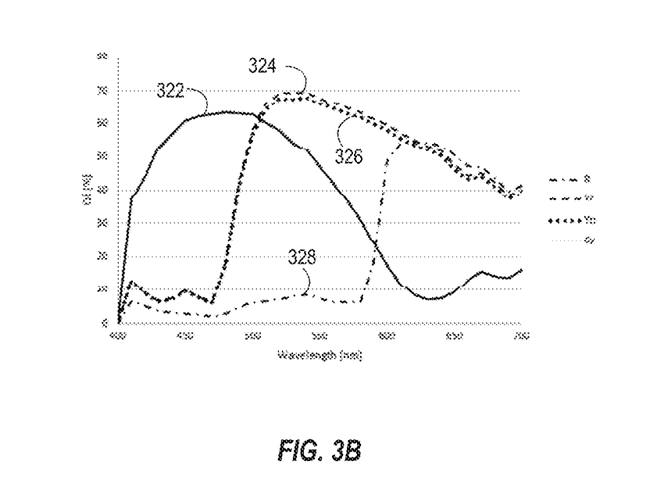
FIG. 3B is a graph of quantum efficiency (QE) versus wavelength showing characteristics of an imager according to an example embodiment.

FIG. 3B shows an example QE of a sensor using the RYYCy filter matrix 224. The QE depends on the dyes used to implement the filter and characteristic of the APS imager without the color filter matrix 224. Consequently, the QE of a particular sensor may vary significantly from that shown in FIG. 3B. Curve 322 represents the QE of the sensor for photons in the cyan spectral range. Curves 324 and 326 represent the QE of the sensor for photons in the yellow to green spectral range, and curve 328 represents the QE of the sensor for photons in the red spectral range. Each of the curves shown in FIG. 3B corresponds to a pixel position in the two-by-two submatrix shown in FIG. 3A. The four pixel positions of the submatrix produce separate signals which are combined by the processing circuitry 108 to generate three color signals, for example, red, green and blue or magenta, yellow and cyan. FIG. 3B shows a drop in QE from a peak of approximately 70 percent around 525 nm (corresponding to yellow light) down to about 50 percent at 800 nm (corresponding to near infrared light). It is noted that the yellow peak is higher than the red and cyan peaks. In addition, FIG. 3B shows that the QE of yellow pixels drops to half at 475 nm so that the blue to violet spectral range from 400 nm to 500 nm does not significantly affect the sensing of light in the red to green spectral range. Because the RYYCy filter matrix uses a red filter in place of the magenta filter of a CyYYM filter matrix, the shape of the red, yellow and cyan curves shown in FIG. 3B may be different from corresponding curves for a CyYYM filter. The cutoff wavelengths for the different spectral ranges, however, are similar.

The RYYCy color filter matrix 224 is different from existing patterns such as RGGB, CyYYM, and RCCC. The filter matrix 224 combined with the lens system 200, designed without regard for the blue to violet spectral range, implement the camera 102 shown in FIG. 1. According to example embodiments, the lens system 200 can be focused to implement a good MTF values light in the red to green spectral range but a relatively reduced MTF for light in the blue to violet spectral range. Because the imager system 220 uses the color filter matrix 224 having red filter elements instead of magenta filter elements as in the standard CyYYM filter matrix, the red-filtered pixels provided by imager array 226 are in good focus as are the yellow-filtered pixels. The only pixels that appear out of focus are the cyan-filtered pixels as the color filter elements covering these pixels include a significant blue component and the MTF of lens system is designed to produce a higher MTF for light in the red to green spectral range than for light in the blue to violet spectral range. If an image of a monochrome resolution target is captured with a lens system, designed as described below, and the RYYCy color matrix shown in FIG. 3A, the subsampled image including only the red pixel data will appear significantly sharper than the subsampled image including only the cyan pixel data even though the imager includes the same number of pixels with red filter elements and cyan filter elements.

An example lens system, such as the lens system 200 shown in FIG. 2, may be designed according to design rules shown in Tables 1, 2 and 3 below. Table 1 shows the wavelength weighting for the lens design. Table 2 shows the polychromatic MTF for the lens design having the wavelength weightings shown in Table 1, and Table 3 shows parameters of the cut filter 216 which is configured to attenuate UV light having wavelengths less than a cut-off wavelength that may range between 410 nm and 395 nm and to attenuate IR light having wavelengths greater than a cut off wavelength that may range between 690 nm and 705 nm. As described above, in some embodiments, the cut filter 216 may be configured to attenuate light having wavelengths less than about 500 nm to attenuate light in the blue to violet spectral range as well as light in the UV spectral range.

TABLE 1

| Wavelength [nm] | Weight |
| --- | --- |
| 660 | 24 |
| 588 | 75 |
| 550 | 100 |
| 510 | 66 |

TABLE 2

| Field of View [deg] | MTF [% at 120 lp/mm] |
| --- | --- |
| 0 | 80 |
| 20 | 75 |
| 40 | 70 |
| 50 | 65 |
| 60 | 65 |

TABLE 3

| Wavelength Range [nm] | Transmittance [%] |
|---|---|
| <395 | <1 |
| >410 < 690 | >95 |
| >705 | <2 |

These design rules specify a lens system in which the focus of light in the red to green spectral range is emphasized over a 60 degree field of view. The weighting design rules shown in Table 1 place more weight on yellow wavelengths than on red wavelengths or blue wavelengths. Thus, the field of view design rules shown in Tables 1-3 specify a relatively high MTF for at least light in the red to green spectral range across the field of view of the lens system. Such a lens system can be used by the processing system 108 of the camera 102 to identify items of interest across the field of view of the camera 102.

Figure 4A:
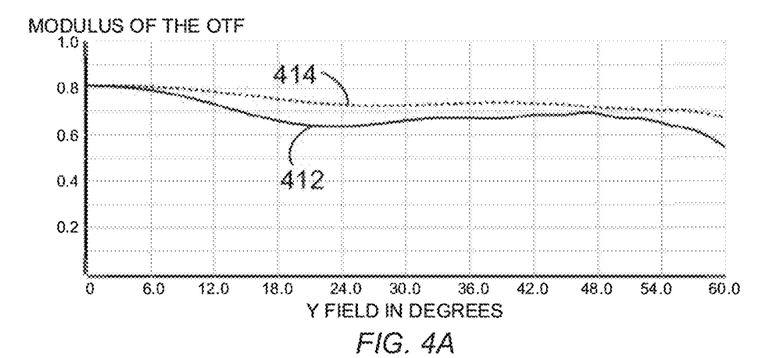
FIGS. 4A, 4B, and 4C are graphs of modulation transfer function (MTF) versus field-of-view angle of a lens system according to an example embodiment.

FIG. 4A shows the design MTF (e.g., the modulus of the design OTF) over the 60 degree field of view of the lens for the range of wavelengths 510 nm to 660 nm associated with the yellow filter elements 304 and 306, shown in FIG. 3A. Curve 412 represents the MTF in the tangential plane and curve 414 represents the MTF in the sagittal plane. The tangential response concerns light in the direction of propagation and the sagittal response concerns light in a direction perpendicular to the direction of propagation. The curves 412 and 414 represent the spatial frequency response of an example lens system at a resolution of 120 lp/mm. As shown in FIG. 4A, the design MTF is not less than 0.8 (80 percent) for 120 lp/mm in the center of the FOV and greater than 0.5 across the 60 degree FOV.

Figure 4B:
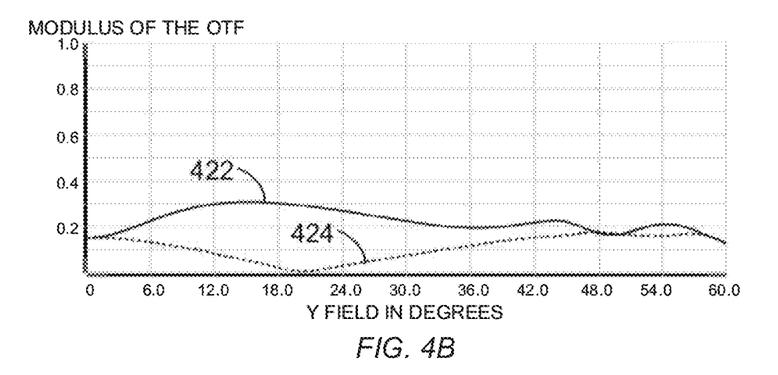

FIG. 4B shows the MTF for wavelengths in the blue range (at about 450 nm). Curve 422 shows the tangential response and curve 424 shows the sagittal response. As shown in FIG. 4B, the MTF is less than 0.5 or even less than 0.4 throughout the FOV also at a resolution of 120 lp/mm.

Figure 4C:
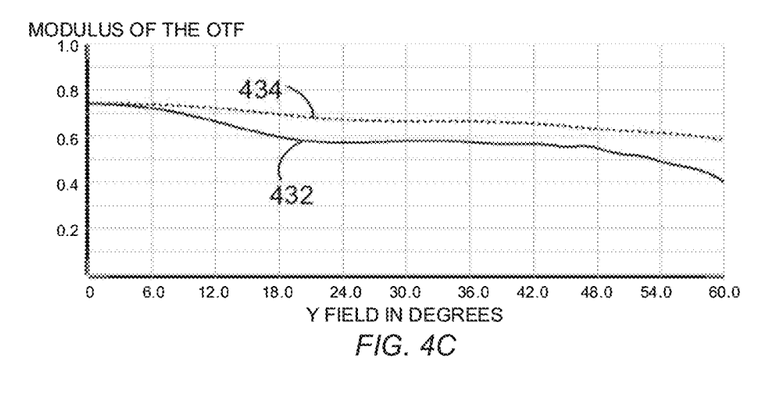

FIG. 4C shows the design MTF for the lens using the standard weighting for visible spectrum from 436 nm to 656 nm. As shown in FIG. 4C, the tangential MTF is less than 0.8 at the center of the FOV and less than 0.5 at many other angles in the FOV.

Figure 5A:
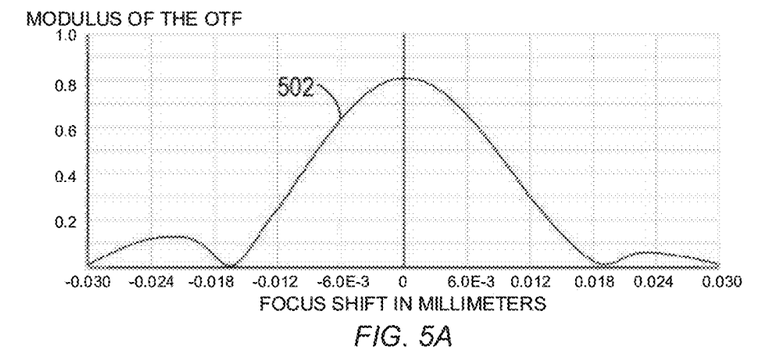
FIGS. 5A, 5B, 5C, 6A, 6B, 6C, 7A, 7B, and 7C are graphs of MTF versus focus shift distance of a lens system according to an example embodiment.
Figure 5B:
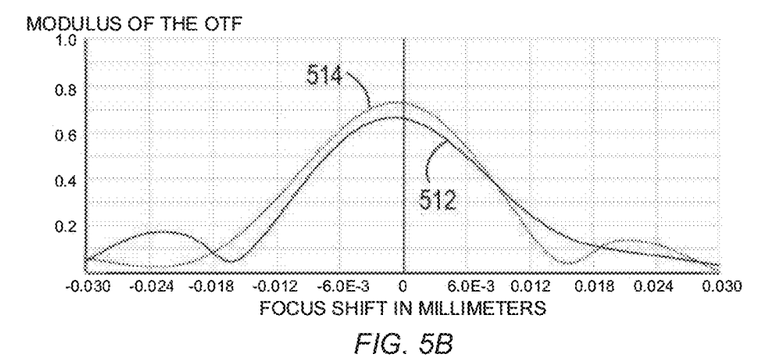
Figure 5C:
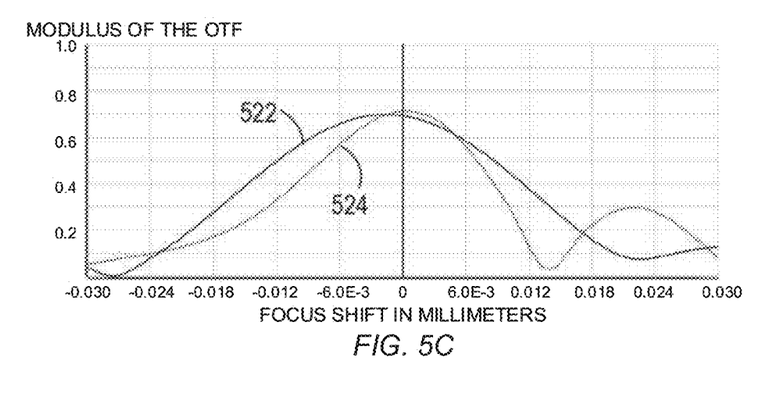

FIGS. 5A, 5B, and 5C show the MTF for light in a range of 510 nm to 660 nm (e.g., light in the red to green spectral range) as a function of focus shift for an example lens system 200 designed in accordance with the design rules shown in Tables 1, 2, and 3. The MTF values shown in FIGS. 5A, 5B, and 5C are at a resolution of 120 lp/mm. FIG. 5A shows the focus response at 0 degrees in the FOV, FIG. 5B shows the focus response at 30 degrees in the FOV, and FIG. 5C shows the focus response at 60 degrees in the FOV. Because FIG. 5A shows the response at 0 degrees, the tangential and sagittal curves are coincident and are represented by the curve 502. In FIGS. 5B and 5C, curves 512 and 522 show the respective tangential focus responses and curves 514 and 524 show the respective sagittal focus responses. FIGS. 5A, 5B, and 5C show a focus shift of approximately 0 mm for light in the 510 nm to 660 nm spectral range.

Figure 6A:
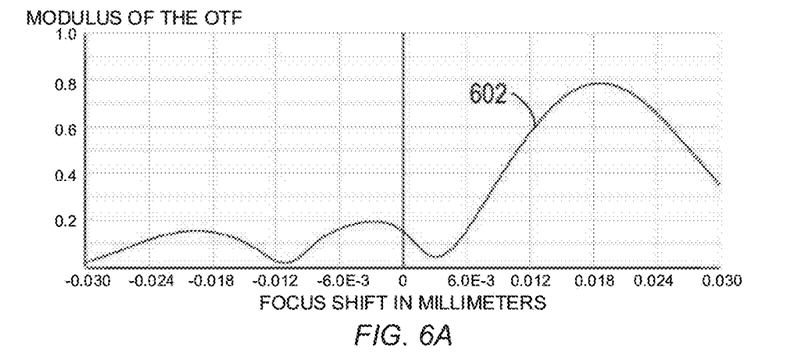
Figure 6B:
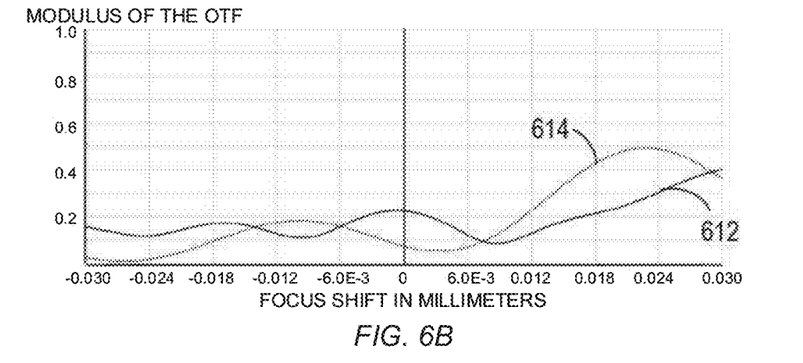
Figure 6C:
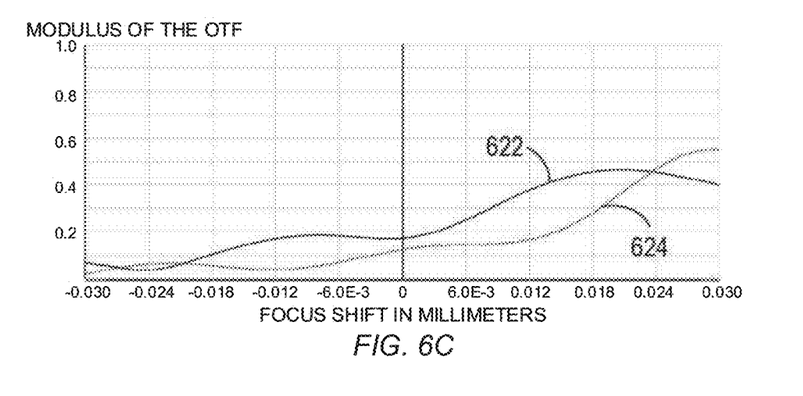

FIGS. 6A, 6B, and 6C show focus response (e.g., MTF versus focus shift) for light at about 450 nm (e.g. blue light) for a lens system 200 designed according to the design rules shown in Tables 1, 2, and 3. The MTFs shown in FIGS. 6A, 6B, and 6C are also at a resolution of 120 lp/mm. Curve 602 in FIG. 6A shows the tangential and sagittal focus response of blue light at 0 degrees in the FOV. Curves 612 and 614 of FIG. 6B respectively show the tangential and sagittal focus response of the lens system 200 to the blue light at 30 degrees in the FOV and curves 622 and 624 of FIG. 6C show the tangential and sagittal response of the lens system 200 to the blue light at 60 degrees in the FOV. Comparing FIGS. 6A, 6B, and 6C, respectively with FIGS. 5A, 5B, and 5C, shows a shift in the focus point for the blue light of about 0.01 mm at 0 degrees in the FOV relative to the focus point of the light in the red-to green spectral range. It is noted that the shift in the focus point is even greater for angles (e.g., 30 degrees and 60 degrees) further out in the FOV.

FIGS. 5A-6C show that a lens system designed according to the design rules shown in Tables 1, 2, and 3 does not perform well for light in the blue to violet spectral range. For light in the red-to green spectral range, however, the peaks of the MTF for various angles of the FOV are concentrated around the same focus shift region. Thus, light in the red to green spectral range can be brought into focus across the entire FOV at the same time.

Figure 7A:
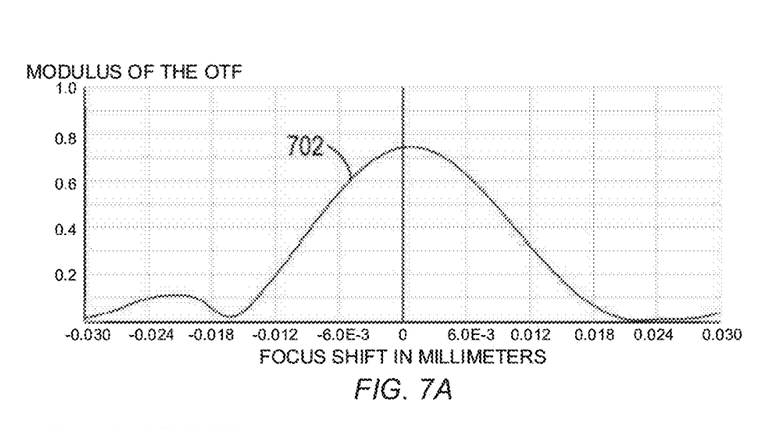
Figure 7B:
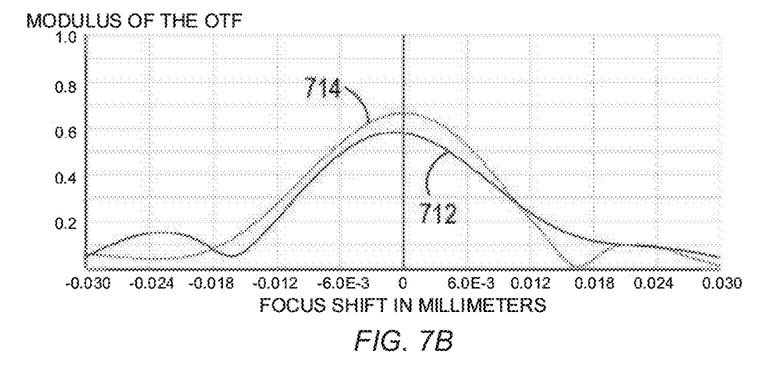
Figure 7C:
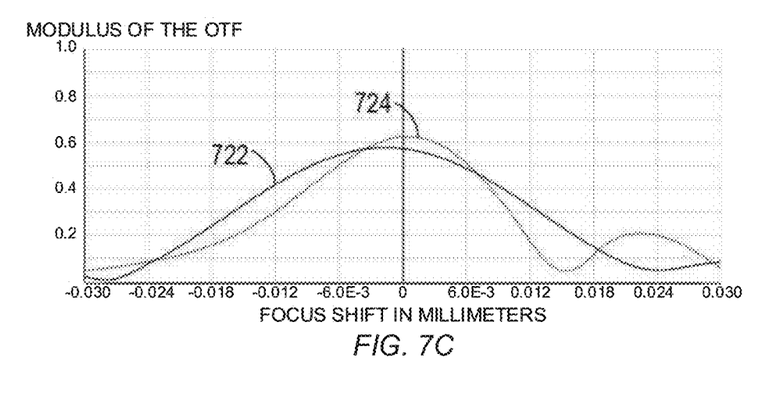

FIGS. 7A-7C shows the focus response for light for light in the red to green spectral range (e.g., from about 430 nm to about 660 nm) for a production lens system 200. As with FIGS. 5A-6C, the MTFs shown in FIGS. 7A-7C are at a resolution of 120 lp/mm and at respective FOV angles of 0 degrees, 30 degrees and 60 degrees. In FIG. 7A, curve 702 represents the focus response of the lens system 200 in both the tangential and sagittal planes. In FIGS. 7B and 7C, curves 712 and 722 represent the respective focus responses of the lens system 200 in the tangential plane and curves 714 and 724 represent the respective focus responses of the lens system 200 in the sagittal plane. The example MTF values shown in FIGS. 7A-7C are lower than the design values described above with reference to FIGS. 5A-5C because the production responses reflect the inclusion of manufacturing tolerances. It is noted, however, that at a focus shift of 0 mm, the MTF of the lens system 200 is still greater than 0.60 at the center of the FOV and greater than 0.55 at both 30 degrees and 60 degrees in the FOV. Although not shown, the MTF of a production lens system 200 for light in the blue to violet spectral range at 120 lp/mm may be between 50 percent to 60 percent of the MTF for light in the red to green spectral range in some parts of the FOV. For example, the MTF for light in the blue to violet spectral range in the center of the FOV may be less than 0.35, at 30 degrees the MTF may be less than 0.33 and at 60 degrees the MTF for light in the blue to violet spectral range may be less than 0.30. These values assume that the lens system 200 is focused based to achieve a relatively high MTF for light in the red-to green spectral range.

EXAMPLES

Example 1 is a camera module having a modulation transfer function (MTF) tuned to be better in a green to red spectral range than in a blue to violet spectral range, comprising: a lens system configured preferentially for the green to red spectral range relative to the blue to violet spectral range; an imager including a plurality of pixel sensors arranged in a matrix, and a color filter matrix positioned between the lens system and the imager, the color filter matrix having a plurality of filter elements corresponding in position to the plurality of pixel sensors of the imager, the filter elements including a larger number of yellow filter elements than red filter elements, wherein the imager is configured relative to the lens system such, that the MTF of the camera module is enhanced for the green to red part of the spectrum.

In Example 2, the subject matter of Example 1 includes, wherein the filter matrix includes multiple two-by-two submatrixes repeating horizontally and vertically across the pixel sensors of the imager, each submatrix including two yellow filter element, a red filter element and a cyan filter element.

In Example 3, the subject matter of Examples 1-2 includes, wherein the filter matrix includes multiple two-by-two submatrixes repeating horizontally and vertically across the pixel sensors of the imager, each submatrix including three yellow filter element and a red filter element.

In Example 4, the subject matter of Examples 1-3 includes, wherein the filter matrix includes multiple two-by-two submatrixes repeating horizontally and vertically across the pixel sensors of the imager, each submatrix including two yellow filter element, a red filter element and a green filter element.

In Example 5, the subject matter of Examples 1-4 includes, wherein the filter matrix includes multiple two-by-two submatrixes repeating horizontally and vertically across the pixel sensors of the imager, each submatrix including two yellow filter element, a red filter element and a clear filter element.

In Example 6, the subject matter of Examples 1-5 includes, wherein the filter matrix includes multiple two-by-two submatrixes repeating horizontally and vertically across the pixel sensors of the imager, each submatrix including two yellow filter element, a red filter element and a blue filter element.

In Example 7, the subject matter of Examples 1-6 includes, wherein the lens system is designed to weight light in a yellow spectral range higher than light in red and blue spectral ranges.

In Example 8, the subject matter of Examples 1-7 includes, wherein the lens system includes a plurality of optical elements including a composed optical element having two optical sub-elements joined by optical cement.

In Example 9, the subject matter of Example 8 includes, wherein at least one optical element of the plurality of optical elements includes an aspherical lens.

In Example 10, the subject matter of Examples 1-9 includes, wherein the lens system includes a cut filter positioned between the lens system and the color filter matrix, the cut filter being configured to attenuate light in an ultraviolet spectral range projected by lens system onto the color filter matrix and imager.

In Example 11, the subject matter of Example 10 includes, wherein the cut filter is further configured to attenuate light in a blue to violet spectral range.

In Example 12, the subject matter of Examples 10-11 includes, wherein the cut filter is further configured to attenuate light in an infrared (IR) spectral range.

Example 13 is a camera module having a modulation transfer function (MTF) tuned to be better in a green to red spectral range than in a blue to violet spectral range, comprising: a lens system configured preferentially for the green to red spectral range relative to the blue to violet spectral range; an imager including a plurality of pixel sensors arranged in a matrix, and a color filter matrix positioned between the lens system and the imager, the color filter matrix having a plurality of filter elements corresponding in position to the plurality of pixel sensors of the imager, the filter elements including a larger number of clear filter elements than red filter elements; and a cut filter positioned between the lens system and the color filter matrix, the cut filter being configured to attenuate light in a blue to ultraviolet spectral range projected by lens system onto the color filter matrix and imager; wherein the imager is configured relative to the lens system such, that the MTF of the camera module is enhanced for the green to red part of the spectrum.

In Example 14, the subject matter of Example 13 includes, wherein the cut filter is further configured to attenuate light in an infrared (IR) spectral range.

In Example 15, the subject matter of Examples 13-14 includes, wherein the filter matrix includes multiple two-by-two submatrixes repeating horizontally and vertically across the pixel sensors of the imager, each submatrix including three clear filter elements and a red filter element.

In Example 16, the subject matter of Examples 13-15 includes, wherein the filter matrix includes multiple two-by-two submatrixes repeating horizontally and vertically across the pixel sensors of the imager, each submatrix including two clear filter elements, a red filter element. and a green filter element.

In Example 17, the subject matter of Examples 13-16 includes, wherein the lens system is designed to weight light in a yellow spectral range higher than light in red and blue spectral ranges.

In Example 18, the subject matter of Examples 13-17 includes, wherein the lens system includes a plurality of optical elements including a composed optical element having two optical sub-elements joined by optical cement.

In Example 19, the subject matter of Example 18 includes, wherein at least one optical element of the plurality of optical elements includes an aspherical lens. The foregoing description of one or more implementations provides illustration and description, but is not intended to be exhaustive or to limit the scope of the embodiments to the precise form disclosed. Modifications and variations are possible in light of the above teachings or may be acquired from practice of various implementations of the embodiments.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. An image capture device for vehicle enhancement, the image capture device comprising:
    a color filter matrix including plurality of filter elements, each of the plurality of filter elements corresponding to each of a plurality of pixel sensors of an image sensor, the plurality of filter elements including a larger number of yellow filter elements than red filter elements; and
    a lens system with a spatial frequency response increased for a green to red spectral range relative to a blue to violet spectral range, the lens system to focus light from a scene through the color filter matrix onto the image sensor.

2. The image capture device of claim 1, wherein the lens system is designed to provide a higher wavelength weighting for light in a yellow spectral range higher than light in red and blue spectral ranges.

3. The image capture device of claim 1, wherein the lens system includes a plurality of optical elements including a composed optical element having two optical sub-elements joined by optical cement.

4. The image capture device of claim 3, wherein at least one optical element of the plurality of optical elements includes an aspherical lens.

5. The image capture device of claim 1, wherein the lens system includes a cut filter positioned between the lens system and the color filter matrix, the cut filter being configured to attenuate light in an ultraviolet spectral range projected by lens system onto the color filter matrix and the image sensor.

6. The image capture device of claim 5, wherein the cut filter is further configured to attenuate light in a blue to violet spectral range.

7. The image capture device of claim 5, wherein the cut filter is further configured to attenuate light in an infrared (IR) spectral range.

8. The image capture device of claim 1, wherein the color filter matrix includes multiple two-by-two submatrixes repeating horizontally and vertically across the plurality of pixel sensors of the image sensor, each submatrix including two yellow filter elements, a red filter element and a cyan filter element.

9. The image capture device of claim 1, wherein the color filter matrix includes multiple two-by-two submatrixes repeating horizontally and vertically across the plurality of pixel sensors of the image sensor, each submatrix including three yellow filter element and a red filter element.

10. The image capture device of claim 1, wherein the color filter matrix includes multiple two-by-two submatrixes repeating horizontally and vertically across the plurality of pixel sensors of the image sensor, each submatrix including two yellow filter elements, a red filter element and a green filter element.

11. The image capture device of claim 1, wherein the color filter matrix includes multiple two-by-two submatrixes repeating horizontally and vertically across the plurality of pixel sensors of the image sensor, each submatrix including two yellow filter elements, a red filter element and a clear filter element.

12. The image capture device of claim 1, wherein the color filter matrix includes multiple two-by-two submatrixes repeating horizontally and vertically across the plurality of pixel sensors of the image sensor, each submatrix including two yellow filter elements, a red filter element and a blue filter element.

13. An image capture method for vehicle enhancement, the image capture method comprising:

focusing light at a lens system from a scene to a color filter matrix, the lens system including a spatial frequency response increased for a green to red spectral range relative to a blue to violet spectral range; and filtering light at a color filter matrix from the lens system to an image sensor, the color filter matrix including plurality of filter elements, each of the plurality of filter elements corresponding to each of a plurality of pixel sensors of the image sensor, the plurality of filter elements including a larger number of yellow filter elements than red filter elements.

14. The image capture method of claim 13, further including attenuating light at a cut filter positioned between the lens system and the color filter matrix, the cut filter being configured to attenuate light in an ultraviolet spectral range projected by lens system onto the color filter matrix and the image sensor.

15. The image capture method of claim 14, wherein the cut filter is further configured to attenuate light in a blue to violet spectral range.

16. The image capture method of claim 14, wherein the cut filter is further configured to attenuate light in an infrared (IR) spectral range.

17. The image capture method of claim 13, wherein the color filter matrix includes multiple two-by-two submatrixes repeating horizontally and vertically across the plurality of pixel sensors of the image sensor, each submatrix including two yellow filter elements, a red filter element and a blue filter element.

18. The image capture method of claim 13, wherein the lens system is designed to provide a higher wavelength weighting for light in a yellow spectral range higher than light in red and blue spectral ranges.

19. The image capture method of claim 13, wherein the lens system includes a plurality of optical elements including a composed optical element having two optical sub-elements joined by optical cement.

20. The image capture method of claim 19, wherein at least one optical element of the plurality of optical elements includes an aspherical lens.

* * * * *